United States Patent Office 3,415,535
Patented Dec. 10, 1968

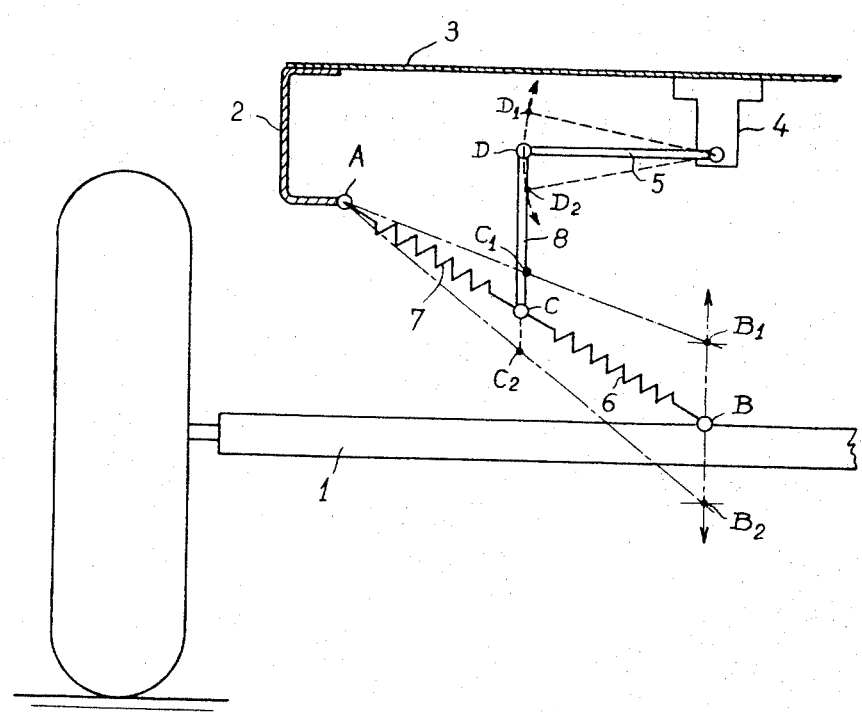

3,415,535
DEVICES FOR CONTROLLING AN EQUIPMENT OF WHEELED VEHICLE AS A FUNCTION OF VARIATIONS IN THE CONDITION OF THE SUSPENSION SYSTEM OF THE VEHICLE
Roland Gamard, Lyon, France, assignor to Automobiles M. Berliet, Lyon, Rhone, France, a corporation of France
Filed Oct. 4, 1966, Ser. No. 584,250
Claims priority, application France, Oct. 7, 1965, 34,125
4 Claims. (Cl. 280—124)

ABSTRACT OF THE DISCLOSURE

Elastic means separate from the suspension system proper of the vehicle extend between the sprung and unsprung portions of the vehicle, and a control linkage extends from an intermediate point on the elastic means to a control member responsive to variations in the suspension system, for example, a valve controlling the distribution of fluid in the suspension system, whereby vibrations and the like in the suspension system are dampened by the elastic means before transmittal to the control member via the control linkage.

This invention relates in general to devices for controlling an equipment of wheeled vehicles as a function of variations in the condition of the suspension system of the vehicle as in the case of now conventional equipments such as the valve or valves controlling the distribution of fluid in a vehicle suspension system comprising means for correcting the trim by means of fluid under pressure, or equipments such as brake fluid distributors designed for distributing brake control fluid as a function of the load carried by the axles of the vehicle.

As a rule, these apparatus are actuated through practically rigid linkage means directly interposed with the apparatus between the sprung portion and the unsprung portion of the vehicle, but this arrangement is objectionable in that the vibration inherent to the unsprung portion are transmitted to the apparatus without any advantage whatsoever.

It is the essential object of the present invention to avoid this drawback by providing a control device characterised primarily in that the means controlling the apparatus in question comprises inherent elastic means interposed between the sprung portion and the unsprung portion of the vehicle and at least one connecting member extending from said apparatus to an intermediate point of said elastic means in order to damp out notably vibration and like detrimental movements of the suspension system, these elastic means are separate from the suspension system proper of the vehicle.

In order to afford a clearer understanding of this invention and of the manner in which the same may be carried out in practice, a typical form of embodiment of the control device constituting the subject matter thereof will now be described by way of example with reference to the single figure of the attached drawing showing diagrammatically a fragmentary view of a vehicle axle equipped with this control device.

In the drawing, the reference numeral 1 designates an axle and 2 is one of the lateral longitudinal members of the chassis or frame of the vehicle which supports a floor 3. In this example it is assumed that the suspension system between the chassis and the axle is of a known type incorporating trim correction means of the pressure-fluid type, these means being fed through the medium of a distributor valve 4 including a control lever 5.

According to this invention this valve is connected to resilient means interposed between the axle 1 and the chassis 2, these means consisting in this example of a pair of coil springs 6, 7 attached at A to the chassis and at B to the axle, the point C intermediate these coil springs being attached to one end of a rigid link 8 having its opposite end pivotally connected at D to the outer end of said control lever 5.

With this arrangement the valve 4 can be controlled as a function of the relative movements of point B with respect to the anchor point A with a ratio $AC/AB$.

The relative position $B_1$ of axle 1 gives positions $C_1$ and $D_1$, and lever 5 is moved in the direction to pressurize the receivers of the suspension system, and the opposite relative position $B_2$ of axle 1 gives positions $C_2$ and $D_2$, and lever 5 is moved in the direction to relieve or unload the receivers of the suspension system through the valve 4.

By properly selecting the resilient connections and the linkage weights or masses, as well as the damping of frictional effects, this arrangement permits of reducing to a substantial extent vibrations that would otherwise be transmitted to point D if a rigid linkage were used in this case between B and D.

If valve 4 is a single valve designed for controlling the trim or level of the axle suspension system concerned, point B will be selected to lie approximately at midlength of the axle.

In most other cases and notably in the case of an independent wheel suspension system this point B may lie at any other suitable location in the unsprung portion of the vehicle.

Of course, the connections AC and CB may consist of various types of metallic springs or any other adequate resilient means adapted to provide the same or an equivalent result; besides, these connections AC and CB may be made of one or a plurality of separate elements.

What is claimed is:

1. In a wheeled vehicle having a sprung portion and an unsprung portion, a suspension system, and a control member responsive to variations in the suspension system, wherein the improvement comprises elastic means separate from the suspension system proper extending from the sprung portion to the unsprung portion of the vehicle, and a control linkage connected at one end to an intermediate point on said elastic means and at the other end to said control member, said control member being adjusted by movement of said control linkage, said elastic means dampening vibrations in the suspension system before transmittal to said control member via said control linkage.

2. In a vehicle according to claim 1, wherein said control member is a liquid flow control valve.

3. In a vehicle according to claim 1, further comprising means including said valve to trim the suspension system.

4. In a vehicle according to claim 1, wherein said control linkage comprises a pair of pivotally interconnected rigid links, and said elastic means extends upwardly at an acute angle with respect to a horizontal plane.

References Cited

UNITED STATES PATENTS 3,074,739  1/1963  Alfieri.
2,988,376  6/1961  Chausson.

PHILIP GOODMAN, Primary Examiner.

U.S. Cl. X.R.

267—34